United States Patent [19]

Luttrell

[11] Patent Number: 5,249,837
[45] Date of Patent: Oct. 5, 1993

[54] ADJUSTABLE HEIGHT FAIRING WITH TRANSLATABLE UPPER FAIRING MEMBER

[75] Inventor: Noel Luttrell, Angola, Ind.

[73] Assignee: Fab-Glas Industries, Inc., Angola, Ind.

[21] Appl. No.: 944,844

[22] Filed: Sep. 14, 1992

[51] Int. Cl.⁵ ............................................. B62D 35/00
[52] U.S. Cl. .................................................. 296/180.3
[58] Field of Search ................ 296/180.3, 180.2, 180.1

[56] References Cited

U.S. PATENT DOCUMENTS

| | | | |
|---|---|---|---|
| 4,082,340 | 4/1978 | Taylor | 296/180.3 |
| 4,749,220 | 6/1988 | Adams et al. | 296/180.3 |
| 4,784,424 | 11/1988 | Wiley, Jr. | 296/180.2 |
| 5,174,626 | 12/1992 | Wiley, Jr. | 296/180.3 |

FOREIGN PATENT DOCUMENTS

| | | |
|---|---|---|
| 3213820 | 10/1983 | Fed. Rep. of Germany . |
| 2098152 | 9/1982 | United Kingdom . |
| 2136362 | 9/1984 | United Kingdom . |

Primary Examiner—Robert R. Song
Attorney, Agent, or Firm—Brooks & Kushman

[57] ABSTRACT

A multi-piece nestable fairing (20) for mounting on the roof (22) of a vehicle (24) is disclosed. The fairing (20) has lower and upper fairing members (26,28). The lower fairing member (26) is mountable to the roof (22) of the vehicle (24). The upper fairing member (28) is selectively translatable relative to and affixable to the lower fairing member (26) between a lowered nested position and a raised operative position thereby altering the overall height of the fairing (20). The lower fairing member (26) preferably has a support (44) configured therein so that the upper fairing member (28) may rest upon the support (44) with the upper fairing member (28) being affixable to the lower fairing member (26) in the raised operative position. Preferably, the upper fairing member (28) has a set of spaced openings (62) which are selectively alignable with lower and upper sets of spaced apertures (48,50) in the lower fairing member (26) so that the upper fairing (28) may be affixed in either the lowered nested position or in the upper raised position.

17 Claims, 3 Drawing Sheets

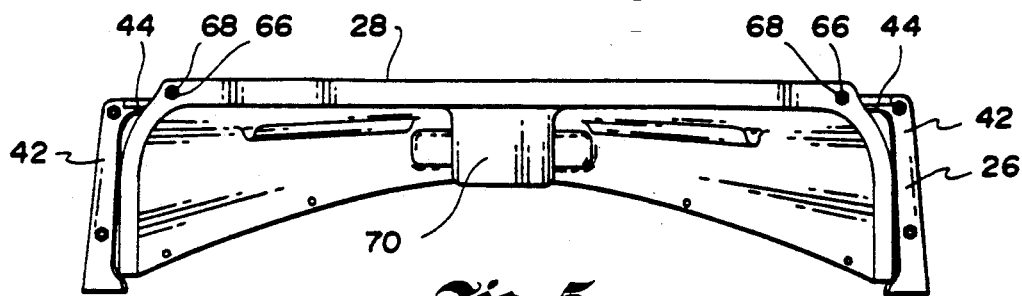
*Fig. 5*
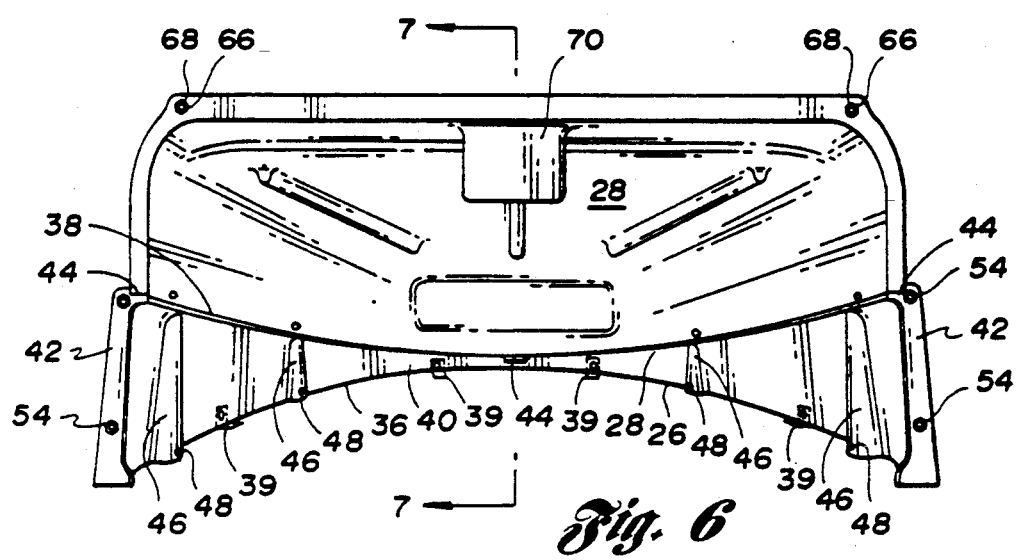
*Fig. 6*
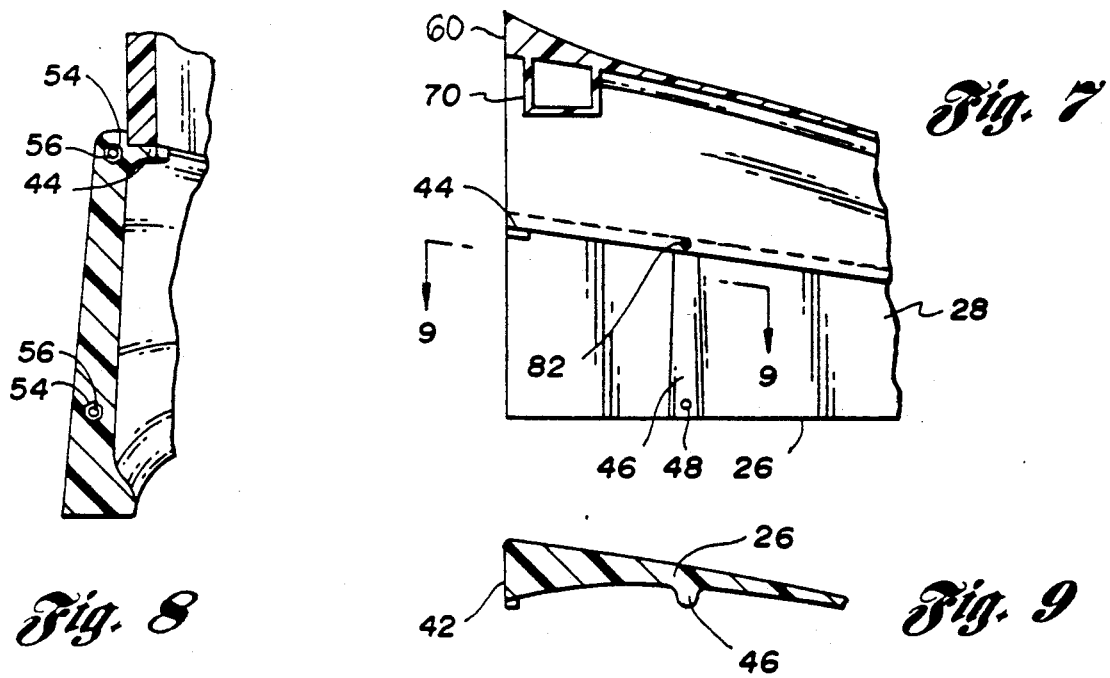
*Fig. 7*
*Fig. 8*
*Fig. 9*

ADJUSTABLE HEIGHT FAIRING WITH TRANSLATABLE UPPER FAIRING MEMBER

TECHNICAL FIELD

This invention relates generally to fairings and, more particularly, to adjustable height fairings.

BACKGROUND OF THE INVENTION

Fairings are often mounted atop vehicle roofs to reduce air resistance or drag on trailers being pulled by vehicles, such as semi-tractors. The fairings serve to direct wind over and around the upper front flat portion of the trailers. This reduces the drag resistance transferred from the trailers to the vehicles and thereby improves the fuel economy of the vehicles.

Fairings are typically of either a unitary or a multi-piece design and may also include fairing extensions. The unitary fairings are often one-piece moldings of fiberglass. This results in fairings which are economical to make, lightweight, and structurally contiguous.

However, these unitary fairings are generally not adjustable in height which may lead to interference problems with overhead structures. When vehicles with fairings mounted on top thereof are being towed with either their front or rear wheels being held in a raised position, the overall height of the vehicle and fairing is increased. This towing may occur when a tow truck is hauling a disabled vehicle, or else, when a series of vehicles are being shipped in a piggyback fashion with one vehicle being mounted upon the fifth wheel of another vehicle.

Consequently, during towing, the elevated fairings may strike underpasses or tunnels they otherwise would pass beneath in normal vehicle operation. Accordingly, these unitary fairings may have to be removed during towing or shipping of vehicles to avoid interference problems and later be reattached.

Multi-piece fairings avoid this problem by being adjustable in height. When the vehicles are being towed, the overall height of the fairings may be decreased to avoid interference problems with overhead structures. Otherwise, during normal operation, the fairings are set at a greater height to direct air over and around trailers being pulled by the vehicles.

An example of a two-piece fairing is shown in U.S. Pat. No. 4,784,424. This particular device includes a bottom portion which is mounted to the roof of a vehicle and a top portion which is pivotally mounted for movement on the bottom portion so that the top portion may be received within the bottom portion in a folded storage position. At the rear of at least one of the top and bottom portions is a partial closure. Pivotal folding of the top portion relative to the bottom portion is accommodated by a hinge connecting the top portion to the bottom portion. The hinge may be a standard hinge such as a piano hinge or else a living hinge formed by cutting a single molded fairing into top and bottom portions while leaving an uncut portion therebetween which serves as the living hinge.

The fairing of U.S. Pat. No. 4,784,424 has a number of shortcomings. First, adding a hinge to the top and bottom portions adds mechanical complexity and expense to the manufacture of the fairing. Further, in the event the hinge rusts or otherwise deteriorates, the upper portion may become difficult to move between the raised position and the folded storage position.

In the case of the living hinge, load and stress are transferred across the uncut portion when the two portions are articulated relative to one another. Therefore, this joint is subject to failure if the uncut portion is subject to too high of loads. Also, if the uncut articulated joint is overly rigid or insufficiently flexible, movement between the top and bottom portions may be unduly limited.

Further, as the top and bottom portions are foldably joined or articulated together along their front ends, the front ends cannot move with respect to one another thereby limiting the allowable relative movement between the top and bottom portions.

Finally, replacement of the top or bottom portions is difficult. With the fairing employing the living hinge, the entire fairing must be replaced if the top or bottom portion becomes damaged. With the hinged fairing, the hinge must be disconnected and reconnected to the respective portions. If the hinge is corroded or rusted or otherwise damaged, replacement can be difficult.

Some of the above described problems encountered by previous fairing designs are addressed by the present invention which is summarized below.

SUMMARY OF THE INVENTION

The present invention includes a nestable fairing mountable to a roof of a vehicle. The fairing comprises a lower fairing member and an upper fairing member. The lower fairing member is adapted to mount to the roof of the vehicle and, preferably, has support means for providing support to the upper fairing member. The upper fairing member is selectively translatable relative to and affixable to the lower fairing member between a lowered nested position and a raised operative position. Fasteners are provided to fasten the upper fairing member to the lower fairing member in either position.

The support of the lower fairing member is ideally configured to have the upper fairing member rested thereupon while the fasteners affix the upper fairing member to the lower fairing member in the raised operative position Preferably, the support includes three spaced apart positioning pads upon which the upper fairing may stably rest. One pad may be located at a front end of the lower fairing member and two pads may be located adjacent rear peripheries of the lower fairing member. A single individual should be able to lift the upper fairing member and set it upon the support means so that the fairing member can be affixed to the lower fairing member by that lone individual.

The lower fairing member may have lower and upper sets of spaced apertures and the upper fairing may have a set of spaced openings. The fasteners affix the set of openings to the lower set of apertures when the upper fairing member is secured in the lowered nested position and the fasteners fasten the set of openings to the upper set of apertures when the upper fairing member is affixed in the raised operative position. Preferably, the upper fairing member cooperates with the support so that the set of openings are coaxially aligned with the upper set of apertures when the upper fairing member is positioned on the support.

The lower fairing member has a lower periphery and an upper periphery, a front end and a rear periphery located longitudinally rearwardly therefrom. Preferably, the upper periphery is disposed laterally inward of the lower periphery so that the lower fairing member slopes laterally inward from it lower periphery towards its upper periphery. The fasteners may include a set of threaded screws. The lower fairing member may have a plurality of laterally inwardly extending ribs in which the lower set of apertures are located. This allows the openings in the upper fairing member to mate with both the lower set and with the upper set of apertures even though the lower fairing member slopes laterally inward. This is possible because lower set of apertures is aligned directly vertically below the upper set of apertures.

The apertures in the lower fairing member may be threaded to receive the screws. The threaded apertures may be formed by crimping bosses or nutserts into holes formed in the lower fairing member, the bosses having pre-formed threaded apertures located therein. Preferably the apertures open to the interior of the lower fairing member and do not extend through to the exterior surface. Therefore, the fasteners are not visible from the exterior surface of the fairing and the fastener need not be painted to match the color of the fairing to avoid highly visible lines of fasteners which detract from the appearance of the fairing.

The fairing may further include at least one fairing extension which is secured to and extends rearwardly from at least one of the lower or upper fairing members. Either the lower fairing member, the upper fairing member, or both, may have rear peripheries which are thickened in cross-section. The rear peripheries are sized to receive, and have received therein, a plurality of bosses with threaded apertures. The fairing extension may then be threadably secured to the bosses by threaded fasteners, such as screws.

According to another aspect of the present invention, a method is provided for selectively positioning a fairing, which is attached to the roof of a vehicle, between a lowered nested position and a raised operative position. The method comprises the following steps. First, an upper fairing member which is attached to a lower fairing member in a lowered nested position is detached from the lower fairing member. Next, the upper fairing member is translated upward relative to the lower fairing member. Preferably, the upper fairing member is then set upon a support of the lower fairing member. Finally, the upper fairing member is attached to the lower fairing member in a raised operative position.

The lower fairing member may include lower and upper sets of spaced apertures and the upper fairing member may include a set of spaced openings. The step of detaching may include removing fasteners securing the lower set of openings to the lower set of apertures. Further, the step of attaching may include reinstalling the fasteners into the set of openings and the upper set of apertures. The lower set of apertures may be threaded and the fasteners may be threaded screws which are threadedly receivable within the threaded apertures to affix the upper fairing member to the lower fairing member.

It is an object of the present invention to provide a nestable fairing mountable to the roof of a vehicle, the fairing including a lower fairing member, an upper fairing member and fasteners wherein the upper fairing member is selectively translatable and affixable between a lower nested position and a raised operative position.

It is another object to provide the lower fairing member with a support upon which an upper fairing member may be set so that the upper fairing member may be selectively translated upward and affixed to the lower fairing member in a raised operative position by a single individual.

It is yet another object to provide a lower fairing member which has lower and upper sets of spaced apertures and an upper fairing member which has a set of spaced openings, the set of openings being affixable to the lower set of apertures in a lowered nested position and affixable to the upper set of apertures in a raised operative position.

It is yet another object to provide a method of selectively positioning a fairing, attached to the roof of a vehicle, between a lowered nested position and a raised operative position. The method includes the steps of detaching an upper fairing member from a lower fairing member to which the upper fairing member is attached in the lower nested position, translating upward the upper fairing member relative to the lower fairing member, setting the upper fairing member upon a support on the lower support member and reattaching the upper fairing member to the lower fairing member in a raised operative position. Ideally, the upper fairing member can be selectively positioned from the lower nested position to the raised operative position by a single individual.

Another object is to provide a multi-piece fairing which is free of any hinges thereby simplifying the mechanical complexity and reducing the expense of manufacture of the fairing.

An additional object is to provide a fairing which has an upper fairing which can nested within a lower fairing, the upper fairing having a lower periphery which rests adjacent a vehicle roof and which is not constrained by a hinged joint.

These and other aspects of the present invention will be better understood in view of the attached drawings and the following description of the best mode for carrying out the invention.

BRIEF DESCRIPTION OF THE DRAWINGS

FIG. 5 is a rear view of the fairing in a lowered nested position with the upper fairing member being nested within the lower fairing member;

FIG. 6 is a rear view of the fairing in a raised operative position;

FIG. 7 is a fragmentary sectional view taken along line 7—7 of FIG. 6;

FIG. 8 is a rear fragmentary view of the upper fairing member in a raised operative position resting upon a positioning pad of the lower fairing member; and FIG. 9 is a fragmentary sectional view taken along line 9—9 of FIG. 7.

BEST MODE FOR CARRYING OUT THE INVENTION

Figure 1:
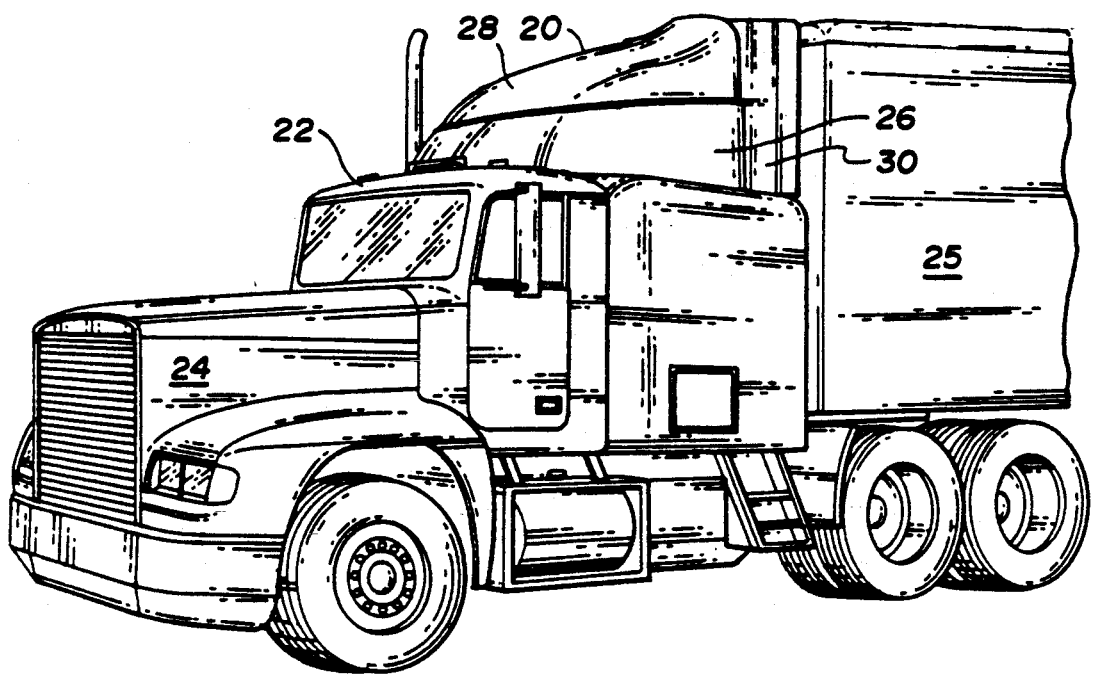
FIG. 1 is a front perspective view of a fairing, made in accordance with the present invention, mounted atop the roof of a vehicle.

A multi-piece fairing 20, made in accordance with the preferred embodiment of the present invention, is illustrated in FIG. 1. Fairing 20 is mounted on the roof 22 of a vehicle 24. Fairing 20 is shown in a raised operative position wherein air is directed longitudinally over and laterally around the front flat surface of a trailer 25 when trailer 25 is being pulled by vehicle 24 travelling in a forward direction, such as down a highway. The drag or air resistance on the vehicle-trailer combination is thereby reduced, increasing vehicle fuel economy.

Figure 2:
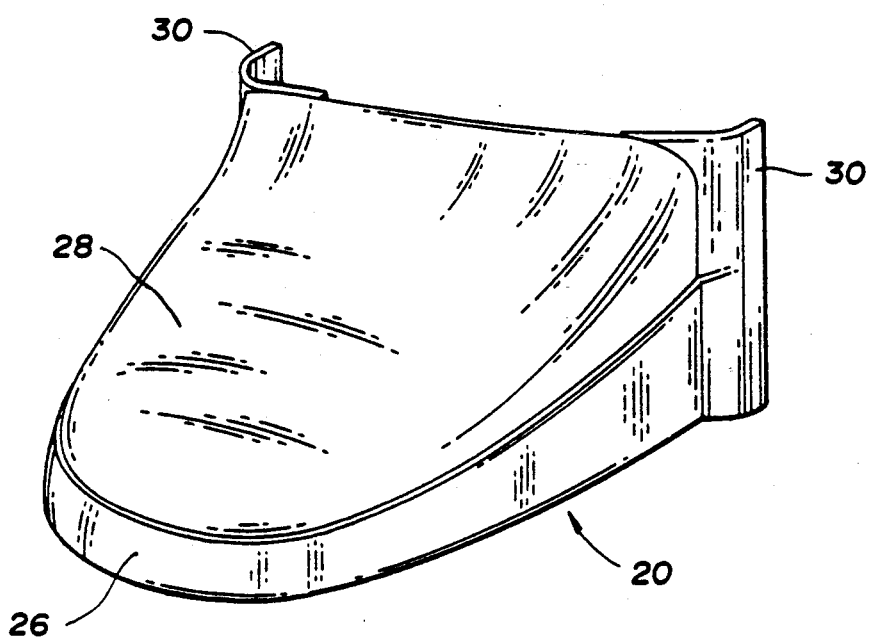
FIG. 2 is a front perspective view of the fairing in a raised operative position.

Referring now to FIG. 2, fairing 20 is again shown in a raised operative position. Fairing 20 is a multi-piece fairing comprising lower and upper fairing members 26 and 28 and preferably also including laterally spaced apart fairing extensions 30. Fairing extensions 30 extend rearwardly from lower and upper fairing members 26 and 28. Fairing extensions 30 may be excluded from fairing 20 if so desired. The mating surfaces between lower and upper fairing members 26 and 28 and fairing extensions 30 preferably form smooth contours thereby reducing the drag created by air passing around fairing 20. Lower and upper fairing members 26 and 28 and fairing extensions 30 are preferably separate moldings made of fiberglass and are therefore very lightweight.

Figure 3:
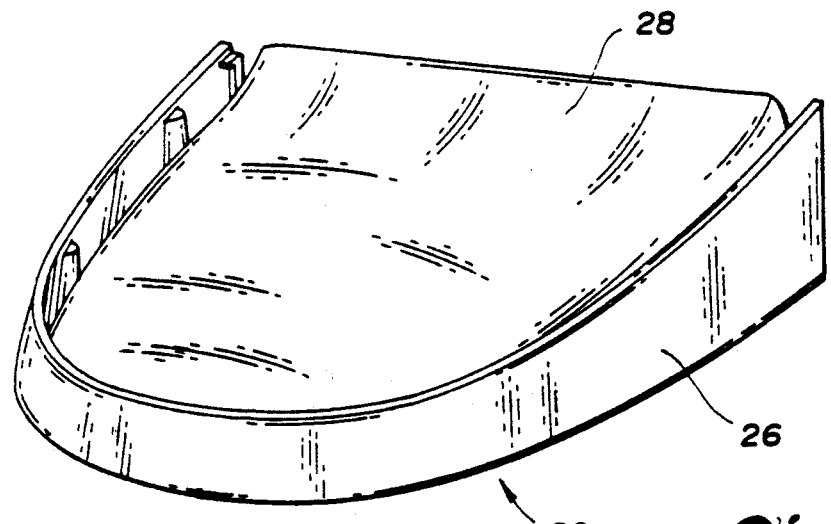
FIG. 3 is perspective view of the fairing in a lowered nested position.

Turning now to FIG. 3, fairing 20 is shown in a lowered nested position and without any fairing extensions 30 being attached. Upper fairing member 28 is in a lowered nested position relative to lower fairing member 26. In this lowered nested position, the overall height of fairing 20 is substantially reduced. This reduction in height allows a number of vehicles to be piggybacked together, or else towed, under overpasses or through tunnels which might otherwise interfere with fairing 20 when mounted on vehicle 24 in its raised operative position.

Figure 4:
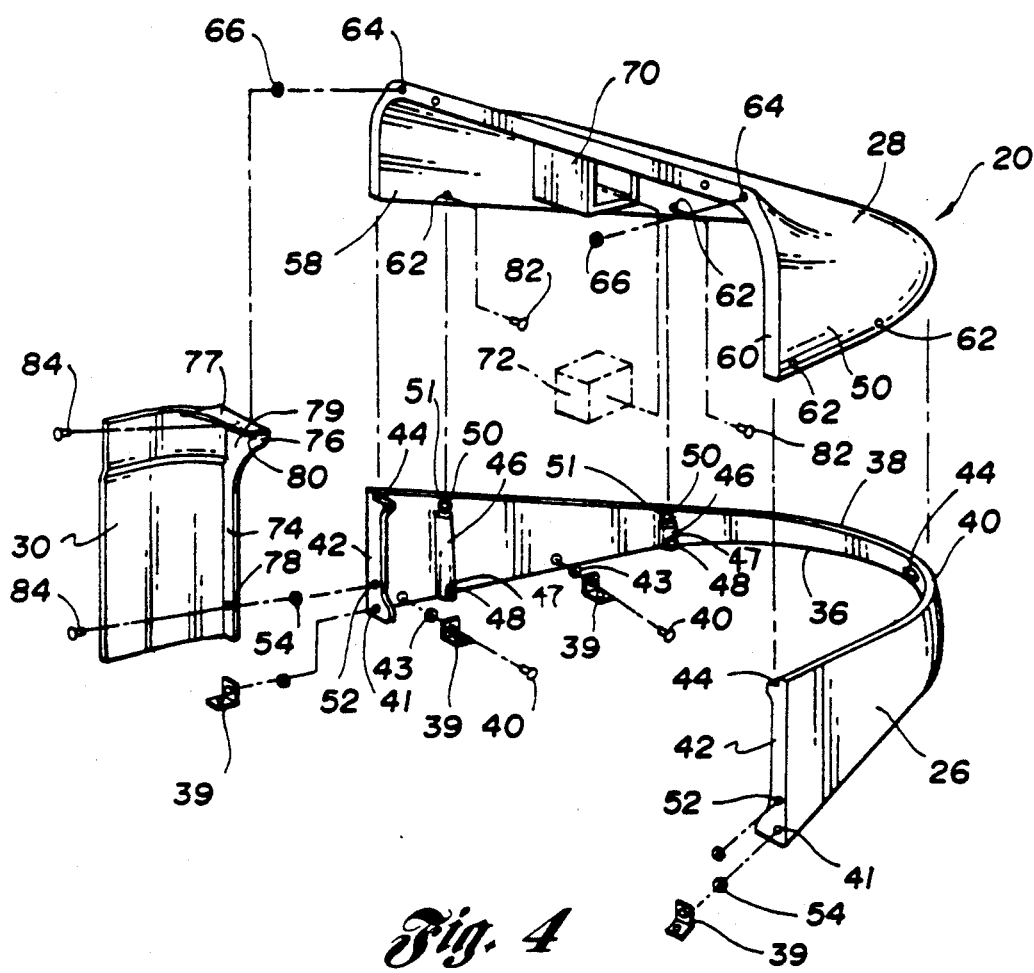
FIG. 4 is a rear exploded perspective view of a lower fairing member, an upper fairing member and a fairing extension.

FIG. 4 is an exploded perspective view of lower and upper fairing members 26 and 28 and of one of fairing extensions 30. FIGS. 5 and 6 are respective rear views, without fairing extensions 30, of upper fairing member 28 in a lowered nested position and in a raised operative position relative to lower fairing member 26.

Lower fairing member 26 has U-shaped lower and upper peripheries 36 and 38, a front end 40 and a pair of laterally spaced and vertically extending rear peripheries 42. Upper periphery 38 is located laterally inward of lower periphery 36 thereby giving lower fairing member 26 a slight lateral inward slope from its lower to its upper periphery. Attached to the inner surface of lower fairing member 26 adjacent lower periphery 36 are a plurality of spaced apart L-shaped brackets 39. Each of the legs of the brackets 39 have apertures formed therein so that screws 40 may be used to secure lower fairing member 26 to apertures (not shown) in roof 22 of vehicle 24. A pair of rear brackets 39 secure to laterally inward extending gussets 41 formed at the lower base of rear peripheries 42. Bosses or nutserts 43, having threaded apertures therein are crimped into holes (not shown) in lower fairing member 26 to provide for reception of screws 40 and to prevent screws 40 from stripping out of the fiberglass of lower fairing member 26

Located along and slightly below upper periphery 38 are three spaced apart positioning pads 44. Two of pads 44 are located adjacent rear peripheries 42 and one pad 44 is located adjacent front end 40. The three pads 44 are planar and preferable lie in a common horizontal plane.

A plurality of spaced vertically and laterally inward extending ribs 46 are positioned around the inner surface of lower fairing member 26. Each rib 46 has a boss 47, containing a threaded aperture 48, crimped therein adjacent lower periphery 36. This results in a lower set of spaced apertures 48 being arranged around the lower inner periphery of lower fairing member 26. Similarly, adjacent upper periphery 38 is a set of spaced threaded apertures 50 contained within bosses 51. Bosses 51 are also crimped into lower fairing member 26. The bosses 51 extend only partially through lower fairing member 26 thereby leaving its exterior smooth free of holes and exposed and unsightly fasteners when fasteners are installed.

Rear peripheries 42 are generally thickened in cross-section as compared to most of the rest of lower fairing member 26. FIG. 9 illustrates the thickening of lower fairing member 26 adjacent rear periphery 42. This enlarged cross-section allows holes 52 to be drilled in rear peripheries 42 with bosses 54, having threaded apertures 56 formed therein, being crimped or otherwise secured within holes 52.

Upper fairing member 28 has U-shaped lower periphery 58 and U-shaped rear periphery 60. Located adjacent lower periphery 58 is a set of spaced openings 62 which extend through upper fairing member 28. The set of openings 62 are located to be selectively and coaxially alignable with both the lower set of apertures 48 and the upper set of apertures 50 of lower fairing member 26. Holes 64 are formed in rear periphery 60 for receiving bosses 66 having threaded apertures 68 therein. Similar to rear peripheries 42 of lower fairing member 26, rear periphery 60 is enlarged in cross-section, as shown in FIG. 7, to accommodate bosses 66 and to provide fairing 20 with greater structural stability against lateral sway. A satellite-receiver box 70 is formed beneath the inner upper surface of upper fairing member 28 for holding a satellite receiver 72.

As seen in FIG. 7, preferably no rear enclosure is formed by the rear periphery 60 of upper fairing member 28 or rear peripheries 42 of lower fairing member 26. The freedom from enclosures provides better access to the interior of fairing 20 to remove fasteners and to selectively reposition upper fairing member 26 with respect to lower fairing member 28. In the lowered nested position, the distance between roof 22 of vehicle 24 and the inner surface of the ceiling of upper fairing member 28 is approximately two feet.

Looking again to FIG. 4, each of fairing extensions 30 has a vertically extending flange 74 and a transverse flange 76, both of which extend laterally inwardly and are configured to mate with rear peripheries 42 and 60 of lower and upper fairing members 26 and 28. Transverse flange 76 is L-shaped in cross-section to provide enhanced structural strength relative to a similar flange having only a single flat flange. Spaced apertures 78 and 80 are formed in respective vertically extending flange 74 and transverse flange 76 and are coaxially alignable with threaded apertures 56 and 68 of bosses 54 and 66.

Fasteners 84, which are preferably threaded screws, are used to affix together lower and upper fairing members 26 and 28 and fairing extensions 30.

In operation, fairing 20 is mounted to roof 22 of vehicle 24. When it is desirable to reduce the overall height of the vehicle 24 and fairing 20, such as during towing or piggy-backed vehicle transport, the fairing 20 is placed in a lowered nested position. To accomplish this, fairing 20 is positioned atop roof 22 of vehicle 24. Fasteners are then used to attach brackets 39 to roof 22 and to lower fairing member 26 to secure lower fairing member 26 to roof 22.

Upper fairing member 28 is then set atop roof 22 and nested within lower fairing member 26. Openings 62 of upper fairing member 28 are coaxially aligned with the lower set of apertures 48 located in ribs 46 of lower fairing member 26. Fasteners 82 are inserted through openings 62 and are threadedly received within apertures 48 thereby securing upper fairing member 28 in a lowered nested position relative to lower fairing member 26. Fairing extensions 30, if intended to be used with lower and upper fairing members 26 and 28, are transported with vehicle 24 to its destination.

When appropriate, upper fairing member 28 may then be selectively repositioned from its lowered nested position into its raised operative position relative to lower fairing member 26. Fasteners 82 are removed from openings 62 and the lower set of apertures 48. Upper fairing member 28 is retracted rearwardly slightly, translated upwardly and then forwardly, with its lower periphery 58 being set upon the three positioning pads 44 during upward translation. The retraction allows upper fairing member 28 to clear the bottom side of pads 44. The three point positioning on pads 44 serves to stably support the upper fairing member 28 relative to lower fairing member 26. As positioning pad 44 is located slightly below upper periphery 38, lower periphery 58 of upper fairing member 28 locates laterally within upper periphery 33. Ideally, this positioning serves to coaxially align the set of openings 62 with the upper set of apertures 50. Fasteners 82 are then be reinstalled through openings 62 and into threaded engagement with apertures 50 thereby affixing upper fairing member 28 to lower fairing member 26 in the raised operative position.

Upper fairing member 28, being made of lightweight fiberglass, is easily liftable by a single individual. Also, as pads 44 serve to position upper fairing member 28 relative to lower fairing member 26, the single individual can coaxial align fasteners 82 with openings 62 and apertures 50 without assistance of another individual. Therefore, the selective positioning of the upper fairing member 28 with respect to lower fairing member 26 is a one-person task.

Next, if fairing extensions 30 are to be attached, apertures 78 and 80 are aligned with apertures 56 and 68 in bosses 54 and 66 and fasteners 84 are threadedly installed to secure fairing extension 30 to lower and upper fairing members 26 and 28.

In accordance with the objects of the present invention, fairing 20 offers several advantages over prior hinged or articulated multi-piece fairings which fold together about a hinge. First, as upper fairing member 28 is translatably or bodily movable with respect to lower fairing member 26, the entire lower periphery 58 of upper fairing member 28 may be placed adjacent roof 22. Securing fairing members together by a hinge limits the relative movement therebetween.

Second, allowing for translatable or free body movement rather than hinged or articulated movement between the upper and lower fairing members frees fairing 20 from manufacturing steps and costs associated with installing or forming a hinge between upper and lower fairing members 26 and 28.

Also, in the event an upper fairing member 28 is damaged, another upper fairing member 28 may be quickly and easily installed. With one-piece articulated fairings, the entire fairing may have to be discarded. With multi-piece fairings using hinges, the hinge must be removed and reinstalled in a new upper piece. Further, hinges may become damaged or corroded thereby reducing their effectiveness.

While this invention has been described in the foregoing specification in relation to certain preferred embodiments thereof, and many details have been set forth for the purposes of illustration, it will be apparent to those skilled in the art that the invention is susceptible to additional embodiments and that certain details described herein can be varied considerably without departing from the basic principles of the invention.

For example, the number openings and apertures shown in fairing members 26 and 28 and fairing extensions 30 have been limited to clarify the drawings. Those skilled in the art will appreciate that a greater number of threaded connections may be made to secure components of fairing 20 together. For example, a total of 10-20 fasteners 82 will probably be used to secure upper fairing member 28 to lower fairing member 26 rather than just the four connections shown. The desired number will of course depend on the particular size of the fairing to be used. Also, other support means for supporting and positioning upper fairing member 28 relative to lower fairing member 26 may be used without departing from this invention. Further, it is within the scope of the invention to nest the upper fairing member outside, rather than inside, the lower fairing member.

What is claimed is:

1. A nestable fairing usable with a roof of a vehicle, the fairing comprising:
  a lower fairing member mountable to the roof of the vehicle;
  an upper fairing member being translatably movable relative to and selectively affixable to the lower fairing member between a lowered nested position and a raised operative position;
  fastening means for fastening the upper fairing member to the lower fairing member in either the lowered nested position or in the raised operative position; and
  the lower fairing having support means for providing support upon which the upper fairing member may be rest so that the fastening means may affix the upper fairing member to the lower fairing member in the raised operative position.

2. The fairing of claim 1 wherein:
  the upper fairing member is nestable within the lower fairing member.

3. The fairing of claim 1 wherein:
  the support means includes three spaced apart positioning pads upon which the upper fairing member may rest.

4. The fairing of claim 3 wherein:
  one pad is located at a front end of the lower fairing member and two pads are located adjacent rear peripheries of the lower fairing member.

5. The fairing of claim 1 wherein:
  the lower fairing member has lower and upper sets of spaced apertures and the upper fairing member has a set of spaced openings, the fastening means fastening the set of openings to the lower set of apertures when the upper fairing member is affixed in the lowered nested position and the fastening means fastening the set of openings to the upper set of apertures when the upper fairing member is affixed in the raised operative position.

6. The fairing of claim 5 wherein:
  the upper fairing member may cooperatively rest upon the support means so that the set of openings is in coaxial alignment with the upper set of apertures.

7. The fairing of claim 5 wherein:

the lower fairing member has a lower periphery and an upper periphery, a front end and a rear periphery located longitudinally rearwardly therefrom, the upper periphery being disposed laterally inwardly of the lower periphery so that lower fairing member slopes laterally inwardly from its lower periphery to its upper periphery.

8. The fairing claim 7 wherein:

the lower fairing member has a plurality of laterally inward extending ribs in which the lower set of apertures is located, the lower set of apertures being spaced vertically directly below the upper set of apertures.

9. The fairing of claim 8 wherein:

the apertures in the lower fairing member are threaded to threadedly receive the fasteners.

10. The fairing of claim 5 wherein:

the lower fairing member has an outer surface which is free of the lower or upper sets of apertures thereby leaving the outer surface without holes therein.

11. The fairing of claim 1 further comprising:

at least one fairing extension which is secured to and extends rearwardly from at least one of the lower or upper fairing members.

12. The fairing of claim 11 wherein:

either the lower fairing member, the upper fairing member, or both have rear peripheries which are thickened in cross-section, relative to the rest of the lower and upper fairing member, the thickened rear peripheries being thick enough to receive, and having received therein, a plurality of bosses having threaded apertures, the fairing extension being threadedly secured to the threaded apertures of the bosses by threaded fasteners.

13. A method of selectively positioning a fairing, attached to the roof of a vehicle, between a lowered nested position and a raised operative position, the method comprising the steps of:

detaching an upper fairing member which is attached to a lower fairing member in a lowered nested position;

translating upwardly the upper fairing member relative to the lower fairing member;

setting the upper fairing member upon support means of the lower fairing member prior to attaching the upper fairing member to the lower fairing member; and attaching the upper fairing member to the lower fairing member in a raised operative position.

14. The method of claim 13 wherein:

the lower fairing member includes vertically spaced lower and upper sets of spaced apertures and the upper fairing member includes a set of spaced openings;

the step of detaching includes removing fasteners securing to the set of openings the lower set of spaced apertures; and the step of attaching includes reinstalling the fasteners into the set of openings and the upper set of apertures.

15. The method of claim 14 wherein:

the set of openings is coaxially alignable with the upper set of apertures when the upper fairing member is set upon the support means.

16. The method of claim 14 wherein:

the lower and upper sets of apertures are threaded and the fasteners are threaded screws which are threadedly receivable within the threaded apertures.

17. The method of claim 13 wherein:

the support means are three spaced apart positioning pads.

* * * * *